March 18, 1969  L. J. RODGERS  3,433,473

PNEUMATIC SPRING

Filed Dec. 12, 1966

Inventor:
Loyal J. Rodgers
By Walter J. Schlegel, Jr.
Russell W. Pyle,  Attys.

United States Patent Office 3,433,473
Patented Mar. 18, 1969

3,433,473
PNEUMATIC SPRING
Loyal J. Rodgers, Kenilworth, Ill., assignor to Amsted Industries Incorporated, Chicago, Ill., a corporation of New Jersey
Filed Dec. 12, 1966, Ser. No. 600,909
U.S. Cl. 267—64   6 Claims
Int. Cl. B60g 11/26; F16f 5/00, 13/00

This invention relates to pneumatic devices and more particularly to a spring and shock absorbing device having combination liquid and pressure gas actuating means.

An object of this invention is to provide convenient and simple means for metering the flow of liquid in the device to afford dampening.

Another object of this invention is to provide simple and convenient means for modifying the dampening characteristics of such a device.

Figure 1:
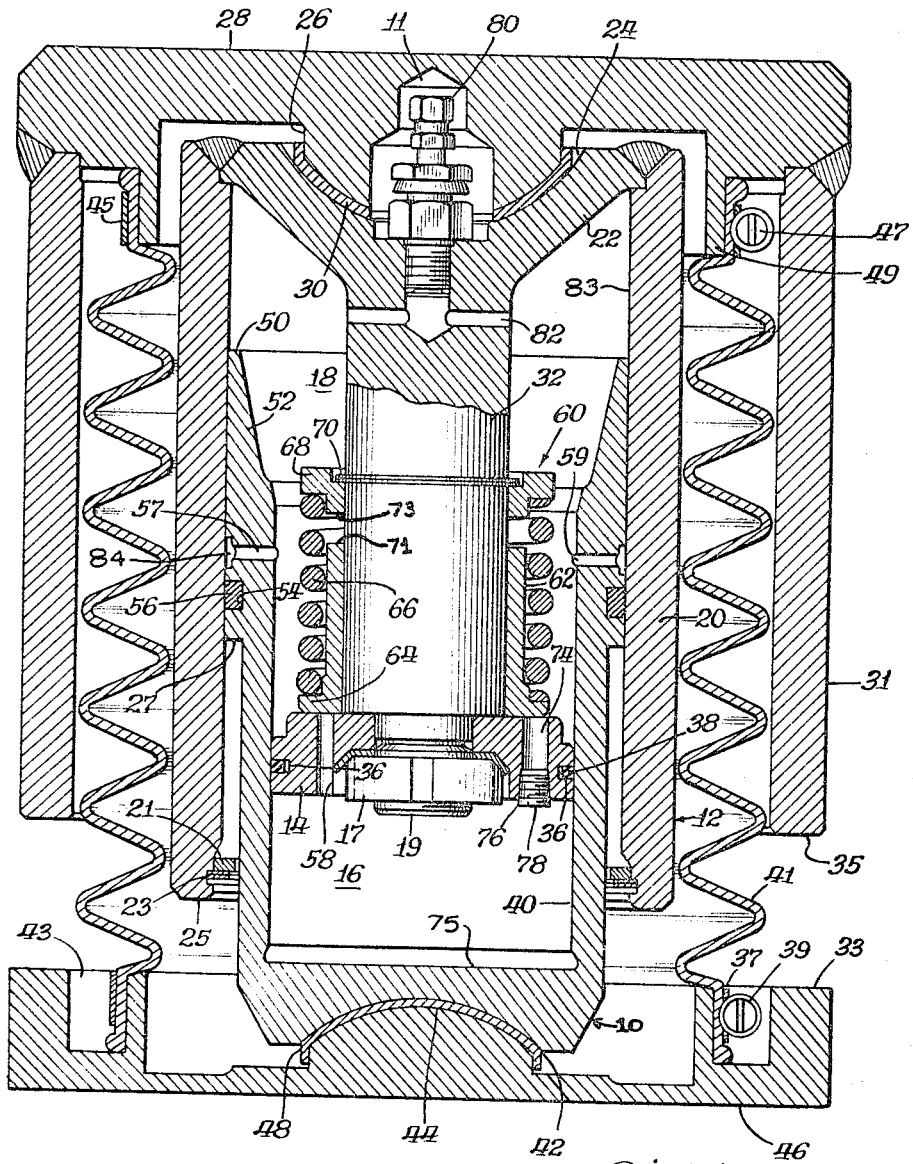
Figure 2:
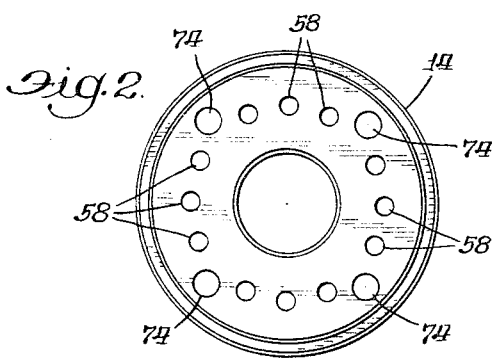

Other objects, which will become apparent to those skilled in the art, will appear hereafter in the following specification and appended claims and in connection with the accompanying drawing wherein:

FIGURE 1 is a cross sectional view of a device that may be used in the practice of the presently described invention; and FIGURE 2 is a top plan view of the inner piston of the embodiment of the invention herein described.

With reference to FIGURE 1, the novel device includes a cup-shaped piston 10 in combination with a cylinder 12 and an inner piston 14 secured to said cylinder, thereby defining a lower chamber 16 and an upper chamber 18. Cylinder 12 has a cylindrical main body 20 and an arcuate enclosed upper end 22 defining a concave spherical outer surface 24 for engagement with complementary dome-shaped portion 26 of top plate 28, with spherical bearing 30 interposed therebetween. Depending from the enclosed end 22 of cylinder 12, coaxial and integral therewith, is inner piston rod 32 having free end 19 to which disk-shaped inner piston 14 is secured by nut 17. An annular recess 36 formed in the outer periphery of inner piston 14 contains ring member 38, which seals against the inner cylindrical surface 40 of cup-shaped piston 10.

Cup-shaped piston 10 has a concave outer end 42 bearing against complementary dome-shaped portion 44 of overload stop base 46, with sperical bearing 48 interposed therebetween. On the outside surface of cup-shaped piston 10, proximate its open end 50 is formed coaxial annular piston head 52, which slideably engages the inner cylindrical surface 83 of cylinder 12, and has an annular recess 54 formed therein containing annular sealing ring 56. Annular piston head 52 may also have a plurality of radially disposed apertures therethrough communicating with an annular recess 84 on the outer surface of said piston head, for self-lubrication of said piston head and the inner surface 83 of cylinder 12.

Excessive axial extension of cup-shaped piston 10 may be prevented by the provision of a retaining ring 21 held by retaining spring 23 in the inside cylindrical surface of cylinder 12, proximate its free end 25, said retaining ring being engageable with the lower edge 27 of annular piston head 52. Excessive compression due to overloading may also be prevented by the combination of cylindrical body 31 surrounding cylinder 12, having top plate 28 secured to one end thereof, and overload stop base 46, having an annular surface 33 formed near its outer periphery engageable with the free annular end surface 35 of cylindrical body 31. An expandable boot 41 is provided to exclude foreign materials from the pneumatic device, the lower end of said boot being held by clip 37 secured by screw 39 within an annular groove 43 formed near the outer periphery of overload stop base 46, the upper end of said boot held by clip 45 secured by screw 47 to an annular step 49 formed in top plate 28. Top plate 28 also has a cavity 11 formed centrally therein for accommodation of valve 80.

With reference now to both FIGURES 1 and 2, partial one-way communication means are provided in inner piston 14 between lower chamber 16 and upper chamber 18. Piston 14 has a first series of axial ducts 58 therein at equal radial distances from the axis of said piston. One-way communication through ducts 58 from lower chamber 16 to upper chamber 18 is provided by valve assembly 60, which comprises cylindrical valve 62, journaled on inner piston rod 32, said valve having flange seal 64 formed at the end thereof adjacent inner piston 14, sealing against the first series of ducts 58 by the force of partially compressed helical valve spring 66, one end thereof abutting the upper surface of flange seal 64, the other end thereof restrained against axial movement relative to cylindrical valve 62 by step ring 68 abutting retaining ring 70 lying in a radial groove (not shown) formed on inner piston rod 32. The upper edge 71 of cylindrical valve 62 is engageable with the lower stepped surface 73 of step ring 68, thereby providing means to limit compression of spring 66 and the axial movement of valve 62.

A second series of axial ducts 74 are also formed in inner piston 14 at a greater radial distance from the axis of said piston than the first series of ducts 58, such that at least a portion of each duct in the second series 74 is not covered by flange seal 64 in its normal abutting engagement with inner piston 14, thereby allowing partial two-way communication between lower chamber 16 and upper chamber 18. Additionally, pressure plugs 76 with smaller ducts 78 therein may be mounted in the second series of ducts 74, for regulation of the degree of two-way communication between lower chamber 16 and upper chamber 18.

In order to render the device operable, lower chamber 16 and a portion of upper chamber 18 are filled with a hydraulic fluid, such as oil, to the extent that at least the surface of inner piston 14 abutting flange seal 64 is covered with liquid when cup-shaped piston 10 is at maximum extension. A charge of pneumatic fluid, such as nitrogen under pressure, is introduced into the remainder of upper chamber 18 through one-way gas valve 80 and ducts 82, before assembly of top plate 28.

As the device is subjected to compressive forces, liquid from lower chamber 16 is forced against flange seal 64 of cylindrical valve 62, causing helical valve spring 66 to compress, thereby allowing liquid to escape from lower chamber 16 to upper chamber 18. At the same time, the pressure of the gas in chamber 18 increases as the volume in said chamber decreases. The compressed gas now tends to extend cup-shaped piston 10, but is partially restrained from doing so, since flange seal 64 of cylindrical valve seals the first series of ducts 58 in inner piston 14, leaving only the second series of ducts 74 as a communication between lower chamber 16 and upper chamber 18. With time, the device will completely recover its load carrying ability.

It may now be seen that the pressurized gas in upper chamber 18 in combination with cylinder 12 and cup-shaped piston 10 will cause the device to have the properties of a spring. During compression, the pressure in upper chamber 18 may act on the combined areas of annular piston head 52 and the bottom 75 of cup-shaped piston 10. During extension, the device will exhibit properties of a shock absorber, since the fluid pressure in upper chamber 18, while acting on piston head 52, may act only gradually on the bottom 75 of cup-shaped piston 10, as limited by the reduced flow of liquid from upper chamber 18 to lower chamber 16 through the restricted openings 74 in inner piston 14.

The spring characteristics of the device may be altered by increasing or decreasing the gas pressure in upper chamber 18, or by adding additional quantities of oil while holding the internal pressure constant. The dampening characteristics may be modified by changing the size of the second series of ducts 74 in inner piston 14.

It will be understood that various changes in the details, materials, steps and arrangements of parts, which have been herein described and illustrated in order to explain the nature of the invention, may be made by those skilled in the art within the principle and scope of the invention.

Having thus described the invention, what is claimed is:

1. A pneumatic spring comprising an enclosed end cylinder, a cup-shaped piston open at its upper end and engaging the inner surface of said cylinder, an inner piston secured to said enclosed end cylinder and engaging the inner surface of said cup-shaped piston, a first chamber defined by said pistons and cylinder, a second chamber defined by said cup-shaped piston and said inner piston, hydraulic fluid within said second chamber and a portion of said first chamber, a charge of pneumatic fluid within the remaining portion of said first chamber, one-way communication means in said inner piston from said second chamber into said first chamber, and restricted two-way communication means in said inner piston between said chambers.

2. The device according to claim 1 wherein said one-way communication means comprises a first series of ducts in said inner piston, a one-way valve sealing against movement of liquid through said ducts from said first chamber to said second chamber, and said two-way communication means comprises a second series of open ducts in said inner piston.

3. The device as claimed in claim 2 wherein said second series of ducts is partially coverd by said valve., 4. A pneumatic spring device comprising a cylinder open at its lower end, a wall closing the upper end of said cylinder, a piston rod attached to and depending from said wall centrally into said cylinder, an inner piston secured to the end of said piston having an upper open end, said rod, a cup-shaped piston, open end slideably fitted in the cylinder, the inner surface thereof slidably engaged by the inner piston, said pistons and cylinder defining top and bottom chambers respectively above and below said inner piston, a port through said inner piston interconnecting said chambers, normally closed valve means carried by said piston rod for closing said port, spring means carried by the piston rod for urging said valve means into closed position, another port through said inner piston partially closed by said valve means for accommodating slow compression of the device without opening said valve means, said other port comprising a portion at least as small in cross sectional area as that of said first-mentioned port, said bottom chamber containing hydraulic fluid and said top chamber containing a charge of pneumatic fluid.

5. A device according to claim 4 wherein a top plate is seated along a convex spherical surface thereof against a concave spherical surface of the cylinder and is otherwise spaced therfrom 6. A device according to claim 5 wherein a base is seated against the enclosed end of said cup-shaped piston along complementary spherical surfaces of the base and piston, the base and top plate having aligned surfaces engageable to limit closure of the device.

References Cited

UNITED STATES PATENTS

| 2,348,160 | 5/1944 | Thornhill | 267—64 |
| 2,379,388 | 6/1945 | Thornhill | 267—64 |
| 3,237,726 | 3/1966 | Deyeiling | 267—1 |

FOREIGN PATENTS 1,057,891   5/1959   Germany.

ARTHUR L. LA POINT, *Primary Examiner.*

RICHARD A. BERTSCH, *Assistant Examiner.*